United States Patent
Hansen et al.

(10) Patent No.: US 6,211,913 B1
(45) Date of Patent: Apr. 3, 2001

(54) APPARATUS AND METHOD FOR REMOVING BLANK AREAS FROM REAL-TIME STABILIZED IMAGES BY INSERTING BACKGROUND INFORMATION

(75) Inventors: Michael Wade Hansen, Lawrenceville; Lucas Kelsey McDowell, Princeton, both of NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/274,064

(22) Filed: Mar. 22, 1999

Related U.S. Application Data (60) Provisional application No. 60/079,044, filed on Mar. 23, 1998.

(51) Int. Cl.$^7$ .................................................. H04N 5/262
(52) U.S. Cl. ........................... 348/239; 348/231; 348/218
(58) Field of Search .................................... 348/207, 218, 348/220, 222, 239, 589, 587, 592, 598, 599, 600, 231, 232, 208; 382/276, 107; 358/450, 451, 452, 453

(56) References Cited

U.S. PATENT DOCUMENTS

| | | |
|---|---|---|
| 5,469,274 | 11/1995 | Iwasaki et al. . |
| 5,627,905 | 5/1997 | Sebok et al. . |
| 5,629,988 | 5/1997 | Burt et al. . |
| 6,104,438 | * 8/2000 | Saito ..................................... 348/587 |

FOREIGN PATENT DOCUMENTS

| | | |
|---|---|---|
| 0 391 587 | 10/1990 | (EP) . |
| 91-11782 | 8/1991 | (WO) . |
| 96/30856 | 10/1996 | (WO) . |
| 97/39420 | 10/1997 | (WO) . |

* cited by examiner

*Primary Examiner*—Tuan Ho
(74) *Attorney, Agent, or Firm*—William J. Burke

(57) ABSTRACT

An image stabilizer selectively adds image data from a background image to the current image to compensate for data in the current image that is missing due to a sudden shift in the current image relative to the previous images. The current image is warped into the coordinate system of the background image and then the warped current image is merged with the background image to replace any blank areas in the current image with corresponding pixel values from the background image. The image data from the background image which is to be substituted into the warped current image is subject to a low-pass filtering operation before it is merged with the warped current image. The warped current image is merged with the background image to form a modified background image which is then merged with the warped current image. The background image is, itself, warped to track camera motion in obtaining the current image before the background image is merged with the warped current image.

12 Claims, 6 Drawing Sheets

APPARATUS AND METHOD FOR REMOVING BLANK AREAS FROM REAL-TIME STABILIZED IMAGES BY INSERTING BACKGROUND INFORMATION

This application claims the benefit of the filing date of U.S. provisional patent application Ser. No. 60/079,044 filed Mar. 23, 1999.

BACKGROUND OF THE INVENTION

The present invention concerns video stabilization and, in particular, apparatus and a method for adaptively merging a stabilized image with existing background information to hide blank areas in the stabilized image.

Image stabilization is desirable in many applications including news reporting, the production of motion pictures, video surveillance, and motion compensated image coding. In all of these applications, it is desirable to remove unwanted jitter between successive frames of source video. Producers of television news programs want to stabilize video from hand held cameras before presenting it to their viewers. Video from surveillance cameras mounted on swaying or rotating platforms, or on moving vehicles is desirably stabilized so that it can be analyzed by a computer before being presented to human observers.

One method for obtaining a stable image is to mount the camera on a mechanically stabilized platform. Such a platform typically employs gyroscopes to sense platform rotation, and motors to compensate for that rotation. Stabilized platforms tend to be relatively expensive and, because they are based on feedback control systems, do not compensate well for rapid movement of the camera.

Electronic stabilization with imager motion sensors can be used to compensate for camera motion which can not be corrected by the mechanically stabilized platform. Electronic stabilization systems sense platform motion which is not corrected by the electro-mechanical feedback system. The sensed residual motion is converted to transformation parameters which are then used to warp the current image to remove the residual motion, producing a stabilized output image. Electronic stabilization systems may be used without an electro-mechanical stabilization platform to compensate for imager motion. In systems of this type, camera motion may be sensed by mechanical motion sensors such as gyroscopes and accelerometers or they may be sensed directly from the image data by analyzing and correlating predetermined components of successive image frames.

Video Stabilization provides many benefits for processing video that is acquired from an unstable camera. Stabilizing the video provides human viewers with a much better idea of what is happening in the scene and allows detection of details that may go unnoticed if they are masked by image motion. Because many applications which need video stabilization also need to operate in real-time, it is important that the video stabilization operations performed for these applications also operate in real-time. Exemplary electronic and electro-mechanical video stabilization methods are described in U.S. Pat. No. 5,629,988, entitled SYSTEM AND METHOD FOR ELECTRONIC IMAGE STABILIZATION by Burt et al, which is incorporated herein by reference for its teaching on video stabilization techniques.

One method of electronic video stabilization uses information from previous video frames to align the current video frame with a predetermined display coordinate system. To perform this operation, a video processor desirably determines the orientation of the current image with respect to the coordinate system and a transformation of the current image which will bring it into alignment with the coordinate system. Once the correct alignment is determined, the processor applies the determined transformation to "warp" the current frame into alignment with the coordinate system, aligning objects in the current frame to objects in the previous frames. An exemplary warping process is disclosed in the above-referenced U.S. patent. The aligned frame is then displayed on a monitor for human viewers or used for further processing.

Video stabilization for human viewers can have an undesirable side-effect: in which blank regions appear on the edge of the display. These blank regions occur when the camera is subject to substantial motion, causing it to produce an image which is displaced by a relatively large distance from the previous image. The blank regions represent areas where the video processor has no current information about what should be displayed because there is no information for these areas in the current frame after it has been aligned to match previous video frames,. This artifact is described with reference to FIGS. 1, 2 and 3. At time T0 the camera provides the video frame shown in FIG. 1 in which the sailboat 100 is displayed in the center of the screen. This image is aligned with the predetermined coordinate system relative to the sailboat 100. After time T0 but before time T1, the camera moves so that it provides the image frame shown in FIG. 2 at time T1. In this frame, the sailboat 100 is not at the center of the frame but has been shifted substantially to the right. To align the image received at time T1 to the coordinate system of the image received at time T0, the video processor determines that it is necessary to shift ("warp") the frame shown in FIG. 2 by some number, N, pixels to the left.

Figure 1:
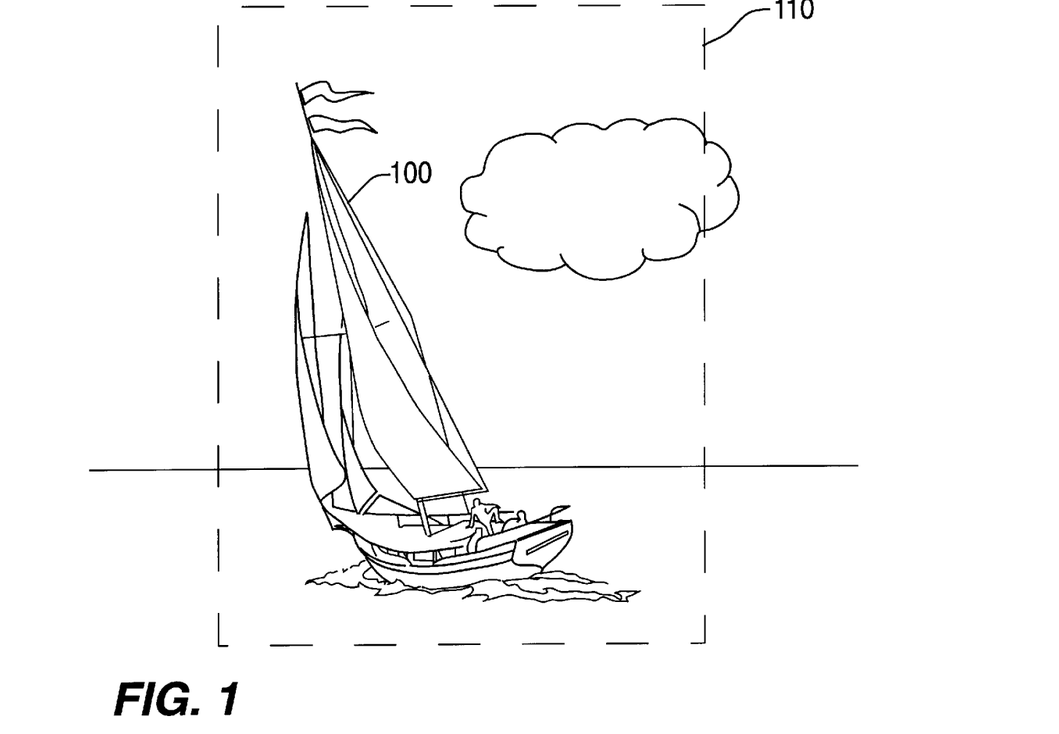
FIG. 1 is an image diagram of a video frame which aligned with a reference coordinate system.
Figure 2:
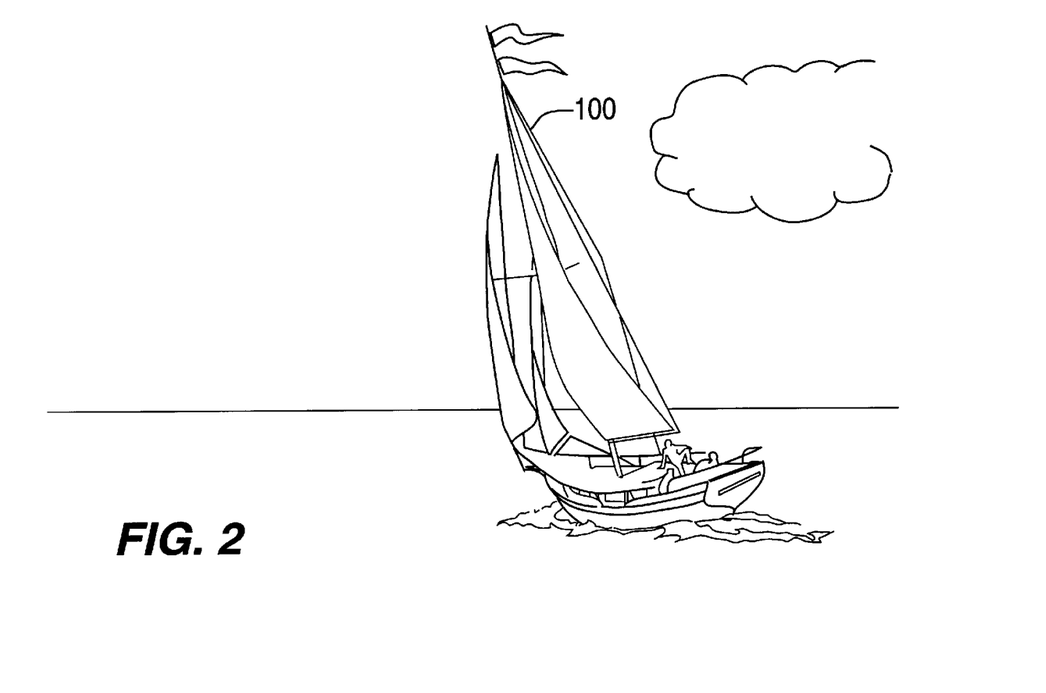
FIG. 2 is an image diagram of a video frame provided by a camera after the camera has been abruptly moved.
Figure 3:
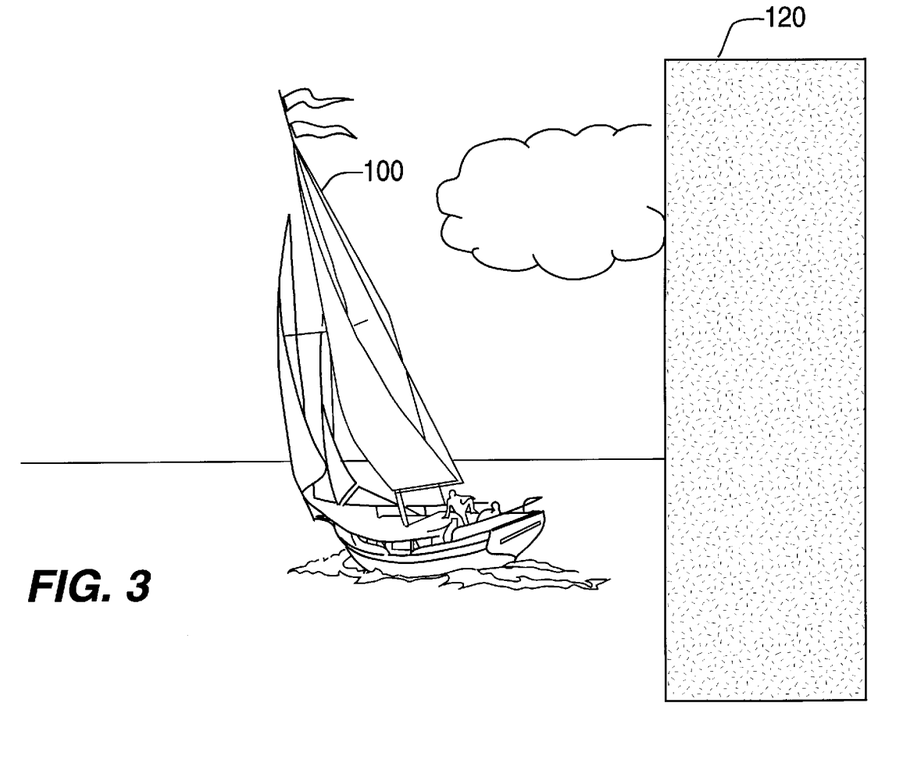
FIG. 3 is an image diagram of the video frame of FIG. 2 aligned with the video frame in FIG. 1.

Thus, when the frame shown in FIG. 2 is warped for display, an area N pixels wide from the right side of frame is not displayed, while an N pixel wide area 120 on the left edge of the frame is blank because no information from the frame shown in FIG. 1 is available to fill that area. The area of the display with current video, centered on the sailboat 100, is stable but there is a distracting blank area 120 on the right side of the image. Although the blank area is shown on the right side of the image, it may appear on any side or on all sides of the display and may change rapidly depending on the type, amount and direction of the motion to which the camera is subject.

Depending on the type of signal being displayed, some amount of motion can be stabilized without creating blank regions if the signal includes valid video data which is not visible on normal displays. For example, in standard NTSC video, there is a significant amount of valid video data which forms a border around the visible region of the display. This data represents an overscan portion of the image. Television set designers typically incorporate this overscan into the displayed image to compensate for variations in assembly and for the local strength of the earth's magnetic field which tend to magnify, reduce or shift the displayed image. By designing the television receiver to display the data over an area greater than the visible area of the screen, these shifts in the image may be accommodated without displaying any artifacts that would be noticed by a viewer. This overscan data is visible when special display monitors are operated in "underscan" mode. This overscan data can be used by video processors to compensate for blank video areas such as that shown in FIG. 3. With reference to FIG. 1, if, for example, the overscan on the television receiver caused only the area indicated by the dashed line 110 to be displayed, then the image shift that occurs between time T0 and time T1 may be accommodated by shifting the image to the left, eliminating the overscan on the right side of the image. If there are N pixels to the right of the normally displayed region, then, when the image is shifted to the right by N pixels, N pixels from the overscan region are shifted into the visible region of the display and there is no blank region.

There are, of course, limits to the usefulness of the overscan data. When large image shifts are necessary to compensate for large amounts of motion, then the imaging apparatus data from the overscan region may reduce the size of the blank region, but it will not be able to compensate for all magnitudes of motion. If there are P pixels of overscan data on each side of the visible image, then motion shifts of more than P pixels will still cause blank regions on the display.

In addition, because the overscan region of the video signal represents data that is not seen by the viewer, it is desirable to keep this region as small as possible. Thus, the data in the overscan region can not be used to compensate for large image shifts.

Previously, others have tried to use electronic zoom as a method for blank removal. This method artificially increases the size of the overscan region by zooming the displayed image by a small factor. Portions of the video data that would otherwise be in the visible region of the display now become part of the overscan region. This greatly increases the size of the overscan region and thus provides a much larger buffer which is available for filling in blank regions. There are, however, serious problems with this technique. First, while larger magnitudes camera motion can be handled without displaying blank regions, there are still limits to the how much motion can be compensated. Second, by zooming the video image, the field of view is reduced and image quality is degraded. This is a major defect when top quality video is required.

The above mentioned techniques all rely on manipulating the current video frame to try and remove blank regions from the display. The invention described herein is a method for using information from prior video frames to fill areas of the display that would otherwise be blank, without sacrificing image quality or field of view.

SUMMARY OF THE INVENTION

The present invention is embodied in an image stabilizer which selectively adds image data from a background image to the current image to compensate for data in the current image that is missing due to a sudden shift in the current image relative to the previous images.

According to one aspect of the invention, the current image is warped into the coordinate system of the background image and then the warped current image is merged with the background image to replace any blank areas in the current image with corresponding pixel values from the background image.

According to another aspect of the invention, the image data from the background image which is to be substituted into the warped current image is subject to a low-pass filtering operation before it is merged with the warped current image.

According to yet another aspect of the invention, the warped current image is merged with the background image, the merged image is then subject to a low-pass filtering operation and is then merged with the warped current image.

According to another aspect of the invention, the background image is warped to track camera motion in obtaining the current image before the background image is merged with the warped current image.

DETAILED DESCRIPTION

Figure 4:
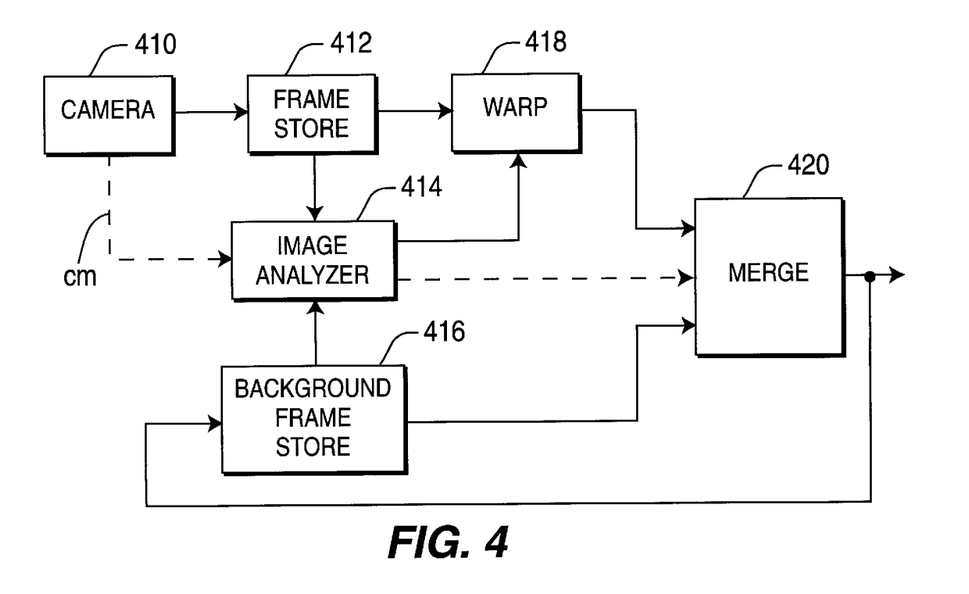
FIG. 4 is a block diagram of a first embodiment of an exemplary image stabilization system according to the present invention.

FIG. 4 shows an exemplary image stabilization system according to the present invention. The system stabilizes image data provided by a camera 410. The camera may include a mechanical stabilization platform (not shown) or motion sensors (not shown) which provide an optional motion signal, CM (shown in phantom), to an image analyzer 414. The optional signal CM provides a rough estimate of the motion of the camera from the previous frame to the current frame.

Image data from the camera 410 is stored in a frame memory 412. The memory 412 is coupled to provide the image received from the camera 410, the current image, to the image analyzer 414. The image analyzer 414 also receives image data from a reference or background image held in the background frame store 416. As described below, in the exemplary embodiment of the invention, this background image is aligned with a predetermined coordinate system. The image analyzer 414 compares the current image to the background image and determines a transformation which will align the current image to the background image. In the exemplary embodiment of the invention, this transformation is an affine transformation although it is contemplated that other parametric transformations may be used.

The image analyzer may operate as described in the above-referenced U.S. patent to Burt et al. or it may compare the current image with the background image as described in U.S. patent application no. 09/148661 entitled DIGITAL SIGNAL PROCESSING CIRCUITRY HAVING INTE- GRATED TIMING INFORMATION by van der Wal et al., which is incorporated herein by reference for its teaching on image registration. The referenced patent application describes a special-purpose processor which determines a parametric transformation that may be used to align a current image with a reference image.

The referenced patent application describes a processor which is used to implement a gradient-based direct image registration technique. This technique uses partial spatio-temporal derivatives of the two images to compute the motion between the images, yielding a parametric transformation that registers the images. The parametric transformation is typically an affine transformation, although other parametric transformations can be easily derived using similar methods.

The transformation that is to be solved is of the following form:

$$I(x,y,t)=I(x+du, y+dv, t+1)$$

with $$du=a+bx+cy \text{ and } dv=d+ex+fy.$$

The solution for the transformation for the variables a, b ..., f using the direct method is shown in equation (1).

$$\begin{bmatrix} \sum I_x^2 & \sum xI_x^2 & \sum yI_x^2 & \sum I_xI_y & \sum xI_xI_y & \sum yI_xI_y \\ \sum xI_x^2 & \sum x^2I_x^2 & \sum xyI_x^2 & \sum xI_xI_y & \sum x^2I_xI_y & \sum xyI_xI_y \\ \sum yI_x^2 & \sum xyI_x^2 & \sum y^2I_x^2 & \sum yI_xI_y & \sum xyI_xI_y & \sum y^2I_xI_y \\ \sum I_xI_y & \sum xI_xI_y & \sum yI_xI_y & \sum I_y^2 & \sum xI_y^2 & \sum yI_y^2 \\ \sum xI_xI_y & \sum x^2I_xI_y & \sum xyI_xI_y & \sum xI_y^2 & \sum x^2I_y^2 & \sum xyI_y^2 \\ \sum yI_xI_y & \sum xyI_xI_y & \sum y^2I_xI_y & \sum yI_y^2 & \sum xyI_y^2 & \sum y^2I_y^2 \end{bmatrix} \begin{bmatrix} a \\ b \\ c \\ d \\ e \\ f \end{bmatrix} = \begin{bmatrix} -\sum I_xI_t \\ -\sum xI_xI_t \\ -\sum yI_xI_t \\ -\sum I_yI_t \\ -\sum xI_yI_t \\ -\sum yI_yI_t \end{bmatrix}$$

given that the summations are performed over the entire spatial extent of the two images.

Solving the system of equations shown in (1) is not easily performed using general-purpose processors. By far, the most computationally expensive portion of this solution is the computation for the equation coefficients through accumulation of values over the entire extent of the image. This accumulation not only involves the inspection of image pixel values over the entire image, but relies on between two to four high-precision multiply and accumulate operations. These are operations that are not well-suited for optimized performance, even with "multimedia enhanced" processors such as the Intel Pentium MMX series of processors, or other multimedia accelerators.

Gradient-based image registration can be implemented efficiently in hardware. The computation of image partial derivatives, image pyramids, and image warping can all be implemented at rates much faster than that of standard video frames. The only limiting factor for the implementation of gradient-based registration, in terms of computational time, is the estimation of the coefficients in equation (1).

The desired coefficients in equation (1) are all functions of the following image/data values:

$I_x$, the partial derivative of the input image in the horizontal direction $I_y$, the partial derivative of the input image in the vertical direction $I_t$, the difference between the two images to be registered x, the horizontal position counter y, the vertical position counter The three image partial derivatives, $I_x$, $I_y$ and $I_t$ are computed by performing convolution of the source images with kernels approximating the desired derivatives. An ASIC such as the PYR-2, available from Sarnoff Corporation, Princeton, N.J., is suitable for this purpose. The horizontal and vertical position counters x and y are generated internal to the image analyzer 414 as it fetches image data from the memories 412 and 416.

Figure 10:
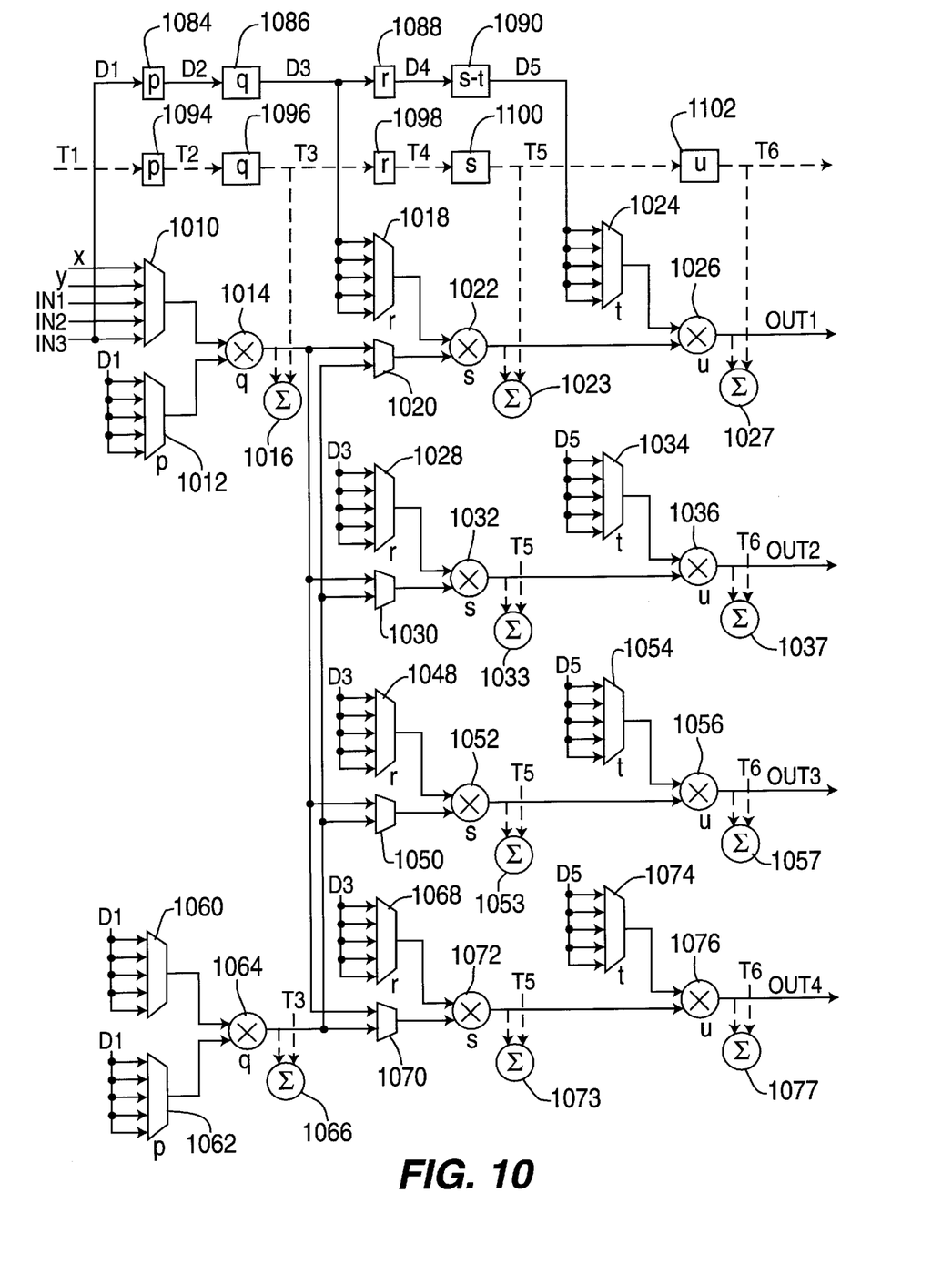
FIG. 10 is a block diagram of a multiply-accumulator which is useful for implementing an image analyzer such as that shown in FIGS. 4, 5 and 6.

The coefficient computation may be implemented by applying the signals x, y, $I_x$, $I_y$ and $I_t$ as the signals x, y, In1, In2 and In3, to the programmable multiply-accumulator shown in FIG. 10. For all of the stages of the coefficient computation, one of the five 8-bit inputs is selected through a multiplexer. This selection is under software control through the use of programmable control registers.

FIG. 10 is a block diagram of an exemplary programmable multiply-accumulator circuit which may, for example, be implemented using a field programmable gate array (FPGA). In this exemplary circuit, five input signals X, Y, IN1, IN2, and IN3 are applied in parallel to multiplexers 1010, 1012, 1060, and 1062. The output signals of multiplexers 1010 and 1012 are applied to a multiplier 1014 which forms the products of the two output values. This output value is applied to an accumulator 1016 and to further multiplexers 1020, 1030, 1050 and 1070. Similarly, the output signals provided by the multiplexers 1060 and 1062 are applied to a multiplier 1064 which produces an output value signal which is applied to an accumulator 1066 and to the multiplexers 1020, 1030, 1050 and 1070.

The input values X, Y, IN1, IN2 and IN3 (collectively referred to as D1) are applied to a delay element 1084 which compensates for processing delay through the multiplexers 1010, 1012, 1060 and 1062 to produce the signal D2. The signal D2 is applied to a compensating delay element 1086 which compensates for the processing delay through multipliers 1014 and 1064. The output signal of the delay element 1086 is a signal D3 which is applied to multiplexers 1018, 1028, 1048 and 1068. In parallel with the delay elements 1084 and 1086, a timing signal T1, which indicates when valid data is present in the signal D1, is delayed by delay elements 1094 and 1096. The output signal of delay element 1096 is a timing signal T3 which may, for example, be applied to the accumulator 1016 to enable the accumulator register (not shown) to add the values provided by the multiplier 1014 to the stored accumulated value.

The output signals of the multiplexers 1018, 1028, 1048 and 1068 are applied to a second rank of multipliers 1022, 1032, 1052 and 1072. These multipliers are coupled to receive a selected one of the signals contained in the composite signal D3 at one input port and one of output signals provided by the multipliers 1014 or 1064 at the other input port. The output signals of the multipliers 1016 and 1064 are applied to the multipliers 1022, 1032, 1052, and 1072 via the respective multiplexers 1020, 1030, 1050, and 1070.

The output signals of the multipliers 1022, 1032, 1052 and 1072 are applied to respective accumulators 1023, 1033, 1053, and 1073. These output signals are also applied to one input port of a third rank of multipliers 1026, 1036, 1056, and 1076 respectively. The signal D3 is delayed by delay elements 1088 and 1090 to produce a signal D5 which is delayed to compensate for the processing delay of multiplexers 1018, 1028, 1048 and 1068 and through multipliers 1022, 1032, 1052 and 1072. The output signals of delay element 1090 are the signals D5 which are applied to multiplexers 1024, 1034, 1054 and 1074.

In parallel with the delay elements 1088 and 1090 are delay elements 1098 and 1100. These delay elements delay the timing signal T3 provided by delay element 1096 to produce a timing signal T5 which is applied to the respective accumulators 1023, 1033, 1053 and 1073. As set forth above, the timing signal T5 may be used to enable the accumulator register when valid data is provided by multipliers 1022, 1032, 1052, and 1072.

Selected ones of the delayed signals X, Y, IN1, IN2, and IN3 provided as a composite signal D5 are applied, by the respective multiplexers 1024, 1034, 1054, and 1074, to a second input port of respective multipliers 1026, 1036, 1056 and 1076. The output signals of these multipliers are respective output signals OUT1, OUT2, OUT3 and OUT4 of the programmable multiply-accumulator circuit. The output signals of the multipliers 1026, 1036, 1056, and 1076 are also applied to accumulators 1027, 1037, 1057, and 1077 respectively. These accumulators are also coupled to received a delayed timing signal T6 from delay element 1102, which is compensated for processing delays through multiplexers 1024, 1034, 1054 and 1074 and multipliers 1026, 1036, 1056, and 1076.

The programmable multiply accumulator shown in FIG. 10 may be used to form four products, each containing four factors, simultaneously. In addition, the computation of these factors may be pipelined such that successive groups of four products may be provided with a delay that is substantially equal to the pipeline delay through a single multiplier. In the circuitry shown in FIG. 10, if a product is to be formed from fewer than four factors, one of the input signals is set to unity and is selected for the later multiplier operations. Alternatively, each multiplier may be configured with a separate unity input such that one of the input signals does not need to be used for this purpose.

The programmable multiply accumulator shown in FIG. 10 can compute the coefficients shown in equation (1) with four image passes. For each pass, the input images to the multiply-accumulator are $I_x$, $I_y$ and $I_t$. The coefficients computed with each pass are shown below:

Pass 1: $\sum I_x^2, \sum xI_x^2, \sum yI_x^2, \sum x^2I_x^2, \sum xyI_x^2, \sum y^2I_x^2$ Pass 2: $\sum I_y^2, \sum xI_y^2, \sum yI_y^2, \sum x^2I_y^2, \sum xyI_y^2, \sum y^2I_y^2$ Pass 3: $\sum I_xI_y, \sum xI_xI_y, \sum yI_xI_y, \sum x^2I_xI_y, \sum y^2I_xI_y, \sum xyI_xI_y$ Pass 4: $\sum I_xI_t, \sum I_yI_t, \sum xI_xI_t, \sum xI_yI_t, \sum yI_xI_t, \sum yI_yI_t$ If the exemplary multiply accumulator processes pixels at a 33 MHz rate, the following execution time can be computed for each pass:

time/pass=(hor$_{size}$+32) (vert$_{size}$+2)*30 nsec+250 µsec

This relationship reflects a horizontal blanking time of 32 pixels, a vertical blanking time of 2 lines, and 250 µsec for control register setup. Using this relationship, the coefficients for a 256×256 pixel size pair of images can be computed in 8 msec. Likewise, a 128×128 pixel sized pair of images yields a execution time of 2.5 msec and a 64×64 pixel sized pair of images yields an execution time of 1.8 msec.

If the camera motion from one image to the next is known to be small or if the camera provides a motion signal, such as the signal CM, which contains information about coarse camera motion, the parametric transform may be computed based only on the current image and the background image. Before applying the transform operation, it may be desirable, however, to subject both the current image and the background image to a high-pass filtering operation (e.g. to compute the Laplacian for each of the images) in order to emphasize edges in the respective images.

If the respective images may be subject to coarse image motion and the camera does not provide any motion information beyond the pixels of the current frame, then it may be desirable to subject both the current image and the background image to several stages of pyramid filtering before attempting to align them. In this instance, a pyramid processor, such as the PYR-2 may be used to produce Laplacian images at several pyramid levels for each of the images. The parametric alignment process may then be applied to the Laplacian images at the highest pyramid level to obtain a coarse alignment. The current image may be warped to correspond to this coarse alignment and the process may be repeated using the Laplacian images at the next lower pyramid levels until the current image is aligned with the background image.

Returning to FIG. 4, the exemplary image analyzer 414 calculates a parametric transformation, as described above, and applies the transformation to a warping processor 418. The exemplary warping circuit may be of the type disclosed in U.S. patent application Ser. No. 08/838,101, filed Apr. 15, 1997, entitled COMPUTATIONALLY EFFICIENT DIGITAL IMAGE WARPING by Lohmeyer et al., which is incorporated herein by reference for its teaching on digital image warping. The warping technique described in the Lohmeyer patent application upsamples the input image by a factor of one to M, to produce a number of samples which is above the Nyquist limit for both the input and output images. The upsampled image is then prefiltered to compensate for low-pass filtering that may occur during the interpolation process. Next, the warping function is applied using, for example, a simple bilinear interpolator. The result is then downsampled by an appropriate factor to produce the output image. In the exemplary embodiment of the invention, if the warping operations performed are predominantly image shifting, as opposed to image scaling, the input samples may be upsampled by a factor of two-to-one and the output samples provided by the interpolator may be downsampled by a factor of one to two. If the parametric transform involves image scaling, such as image zoom, the upsampling and downsampling factors may be used asymmetrically to implement the scaling operations.

After the current image has been warped, by the warping processor 418, to the coordinate system of the background image, it is selectively merged with image pixels from the background image by a merging circuit 420. In the exemplary embodiment of the invention, the merging circuit 420 may operate under control of the image analyzer 414 to substitute image pixels from the background frame store memory 416 at locations where blank pixels exist in the warped current image. The number and location of these image pixels may be determined from the parametric warping function calculated by the image analyzer. If, for example, the current image has no overscan region and the image warper determines that the current image is to be shifted up by 10 pixel positions and to the left by 20 pixel positions at no magnification, the merging circuit 420 is instructed to insert 10 rows of pixels from the bottom of the background image and 20 columns of pixels from the right of the background image into the warped current image. If the current image has an overscan region of known size, the number of pixels in the overscan region is subtracted from the number of shifted pixels to determine the number of pixels to be substituted into the current image from the background image. The image provided by the merging circuit 420 becomes the new background image and is written into the background frame store memory 416.

Alternatively, the location of these pixels may be determined from the actual pixel values themselves. In this implementation, the image warper 418 may provide an invalid pixel value for each pixel in the warped image which was not determined from the current image. In this implementation, the merging circuit may operate in the same manner as a chroma-key system to substitute image pixels from the background frame store 416 for invalid pixel values in the warped image.

This first technique for blank removal, described above with reference to FIG. 4, inserts a background made up of information from prior frames into the otherwise blank areas of the display. This is done in such a way that the background is aligned with the current frame to create a single cohesive frame for display.

The background image is recursively generated. Initially, the frame received at time T0 is the background. At each frame time T, the current background is inserted in the blank areas of the warped current frame, and the merged result is displayed. Finally, that merged current frame becomes the new background frame. Starting with some background at time T0 that fills the whole display, then repeating this process produces a display without any blank regions.

To produce an acceptable stabilized image, it is desirable for the background to be aligned with the current video frame as it will be displayed. This alignment, however, is handled automatically by the stabilization process. When the image analyzer 414 and warping processor 418 register the video frames, they are effectively aligning them to a reference in the coordinate system of the display. In the exemplary embodiment of the invention, this coordinate system is defined by image components of the frame which is received at time T0. Because each video frame is aligned to the same display coordinate system, successive video frames are aligned to each other. Thus, when a new video frame is merged with the background frame constructed from previous video frames in the same coordinate system, the new frame is already aligned with the background, producing a coherent display.

Figure 8:
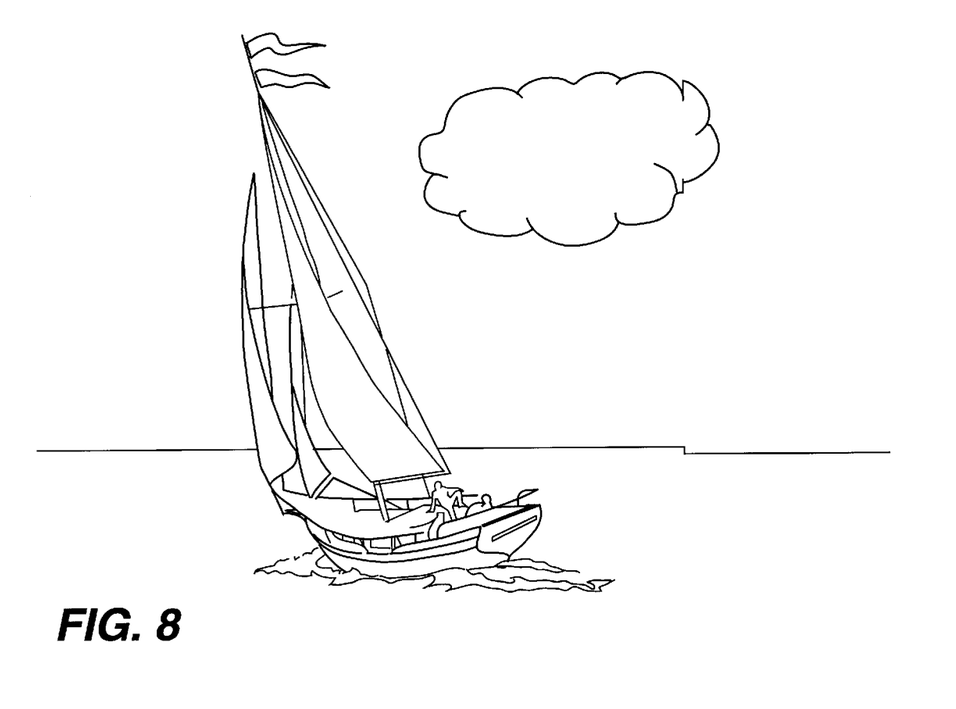
FIG. 8 is an image diagram which is useful for describing the operation of the embodiments of the invention shown in FIGS. 4, 5 and 6.

Although this method produces images without any blank pixels, it may produce images with significant artifacts. Returning to the example shown in FIGS. 1–3, FIGS. 7 and 8 show stabilized images that may be produced using the apparatus shown in FIG. 4. The portion of the image labeled 102 corresponds to the warped current image while the portion of the image labeled 104 corresponds to the portion of the background image which is to be merged with the current image. As set forth above, the coordinate system of the background image is determined from the position of the sailboat 100. Between the frame received at time T0 and the frame received at time T1, the cloud 112 has moved to the left relative to the sailboat such that there is a visible discontinuity in the merged images. Furthermore, between time T0 and time T1, the sailboat has fallen into a trough between two waves such that the horizon line 116 of the current image appears be higher than the horizon line 118 of the background image. Accordingly, even after the current image is warped to the coordinate system of the sailboat 100 and merged with the background image, there may be discontinuities in the composite image. Because the background image is defined recursively, if image motion continues in one direction, there may be multiple discontinuities in the background image. When the discontinuities are caused by motion in a consistent direction, the discontinuities closer to the edge of the background image may be greater than those away from the edge. FIG. 8 shows an example of the 102 and 104 as merged. The discontinuities in the cloud 112 and the horizon 116 of this merged image are apparent.

Figure 5:
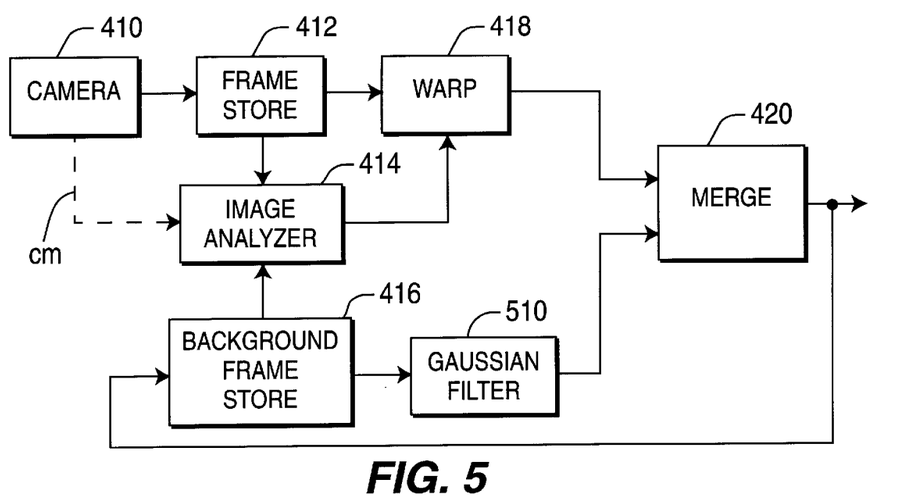
FIG. 5 is a block diagram of a second embodiment of an exemplary image stabilization system according to the present invention.

FIG. 5 shows exemplary image stabilization apparatus which mitigates these types of discontinuities and, at the same time, reduces the relevance of portions of background image as they grow older. The apparatus shown in FIG. 5 is the same as that shown in FIG. 4 except that the apparatus in FIG. 5 filters the background data in a low-pass spatial filter 510 before merging it with the new frame. For example, the filter 510 may be a standard Gaussian two-dimensional filter which produces a noticeable blurring of the background image.

This technique has several advantages. Blurring the background reduces the perceptibility of any inconsistencies within the background, while leaving enough data and texture to provide a peripheral background for the viewer.

Because the background is filtered at each time step, the sharpness of the each area of the background reflects the age of the data; data that has been in the background for a long time has been filtered many times is very blurred, while recent data is more sharp. This is particularly advantageous as the discontinuities in the older data are likely to be greater than in the newer data.

Figure 9:
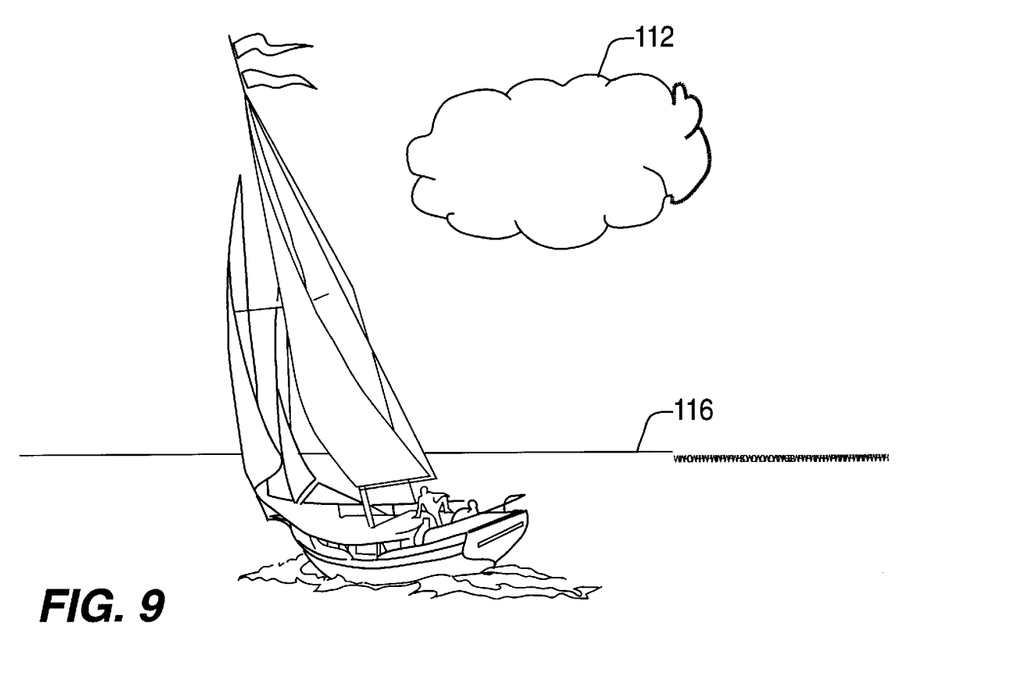
FIG. 9 is an image diagram which is useful for describing the operation of the embodiments of the invention shown in FIGS. 5 and 6.

Blurring the background makes it easier for the viewer to focus on the central live portions of the display. The blurred edges of the display become a sort of peripheral view that adds to the ability to discern information from the display without distracting from the main focus of attention. Because the current image is not filtered, it remains sharp and is not degraded by the low-pass filter 510. FIG. 9 shows an example of an output image that may be produced by apparatus such as that shown in FIG. 5. Because of the blurring, the discontinuities in the cloud 112 and horizon 116 are less noticeable than in FIG. 8.

The apparatus shown in FIG. 5 has solved many of the problems of the blank removal, but there remains a noticeable edge between the newly inserted frame and the (blurred) background. A more seamless transition between the unfiltered live data and the filtered background data would be desirable. This transition should occur, however, without reducing the quality of the displayed current image. One exemplary method by which the transition between the current image and the background image may be made less visible is to process the image using the apparatus shown in FIG. 6.

Figure 6:
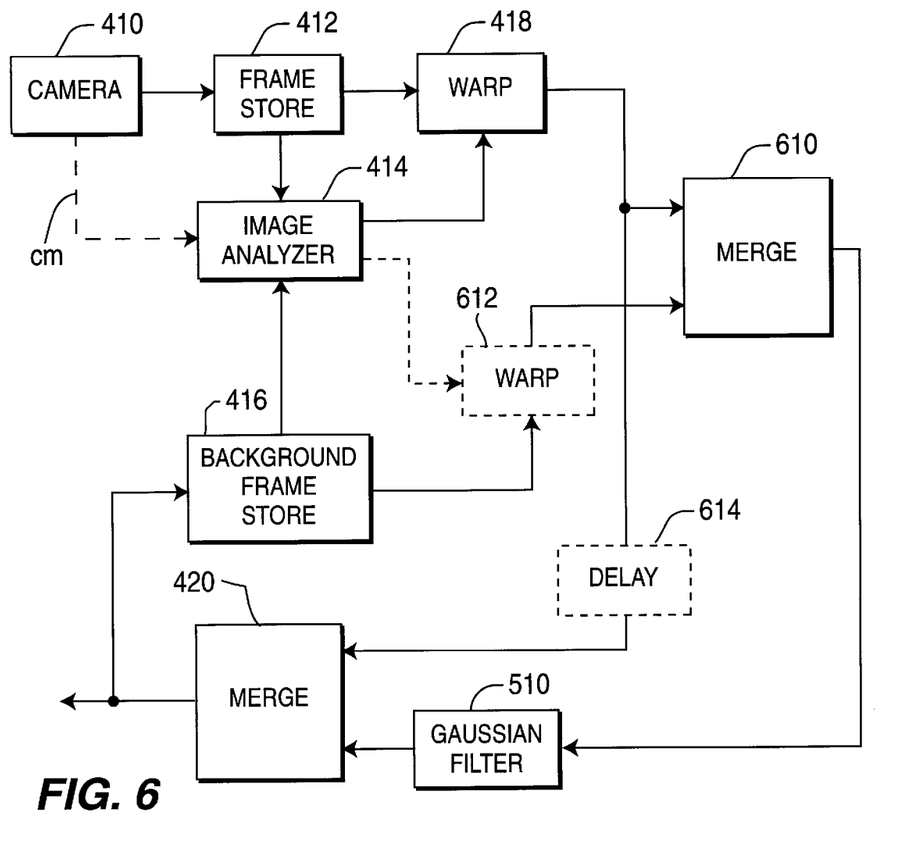
FIG. 6 is a block diagram of a third embodiment of an exemplary image stabilization system according to the present invention.
Figure 7:
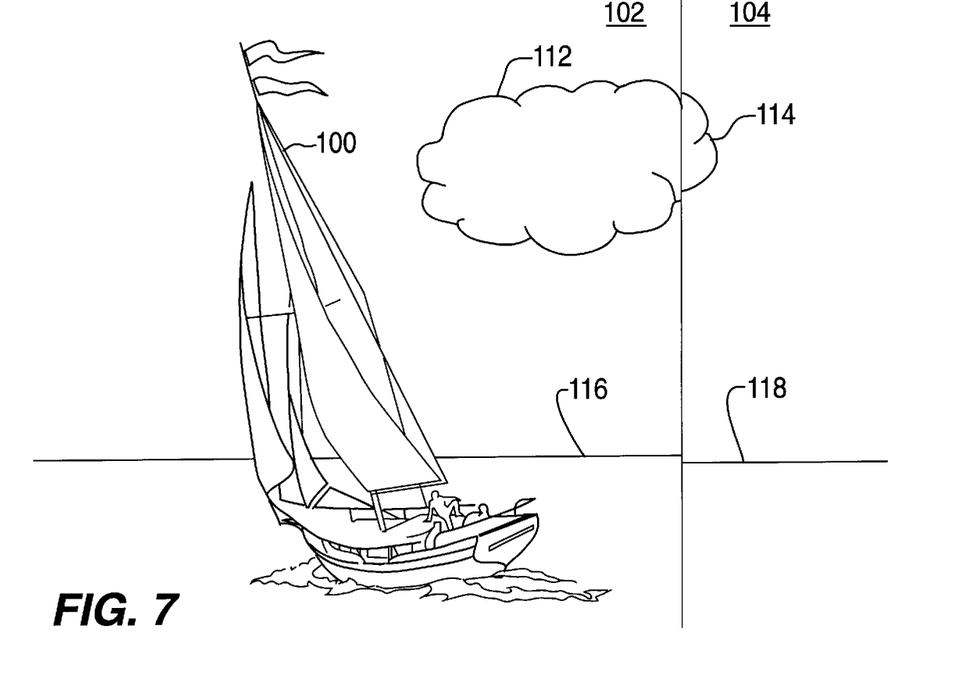
FIG. 7 is an image diagram which is useful for describing the operation of the embodiments of the invention shown in FIGS. 4, 5 and 6.

FIG. 6 shows an exemplary image stabilization system which includes all of the elements of the system shown in FIG. 5. In addition, the system shown in FIG. 6 includes an extra merging processor 610, an optional delay element 614 and an optional warping processor 612. The apparatus shown in FIG. 6 differs from that shown in FIG. 5 in that, before filtering the background image in the filter 510, the background image is merged with the warped current frame.

The filter 510 then acts on the merged frame. The filtered merged frame is then merged again in the merge processor 420 to produce the output frame and the new background frame. In the second merge processor 420, the filtered merged image provided by the merge processor 610 is treated in the same way that the background image in the apparatus shown in FIG. 5. i.e. pixels from the warped frame provided by the warp processor 418 are used whenever possible, otherwise pixels are taken from the filtered merged image provided by the filter 510. The optional delay element 614 is a compensating delay which may be needed to compensate for processing delays through the merge processor 610 so that the image provided by the warp processor 418 is properly aligned with the merged image provided by the processor 610 when both images are applied to the merge processor 420.

Figure 11:
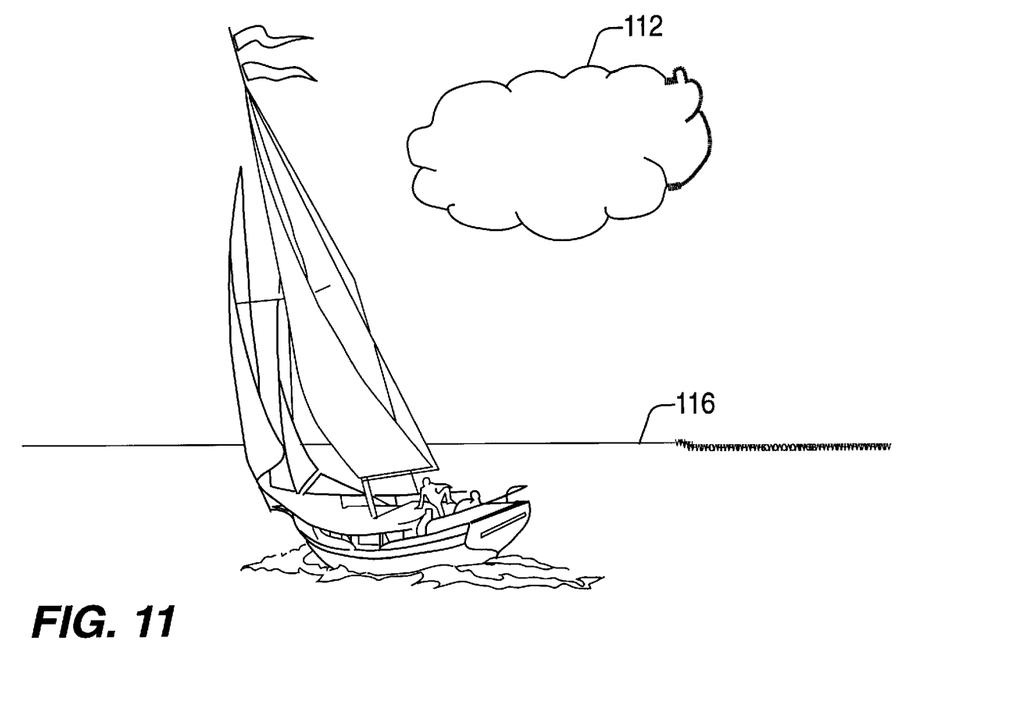
FIG. 11 is an image diagram which is useful for describing the operation of one of the alternate embodiments of the invention shown in FIG. 6.

The current frame is merged with the background frame before filtering in the filter 510 so that the discontinuity is subject to the filtering operation. This operation effectively infuses a portion of the current image into the filtered background image in the vicinity of the boundary between the current image and the background image. Thus, any discontinuities in the merged image produced by the merge processor 420 are smoothed relative to the merged image produced by the apparatus shown in FIG. 5. The resultant display frame still has only the unfiltered data from the current frame where available. However, since the background was filtered once after having the current frame inserted, the areas of the background image which are adjacent to the boundary between the current and background images include information from both the current image and the background image. Thus, without degrading any of data from the current frame, the apparatus shown in FIG. 6 creates a smoother transition from the live data to the background. FIG. 11 shows an exemplary merged image that may be produced using the apparatus shown in FIG. 6.

Another possibility for creating a smooth transition in the merged output image involves the use of a two-input spatial filter (not shown) in place of the merge block 420 shown in FIG. 4. The exemplary filter may, for example, use a number of lines from each image so as to implement a two-dimensional filter. The number of lines used from each image may be the same as for the merge operation performed by the processor 420. When the current image input is fully defined in an area, the filter passes that input without modification. When, however, the first input is not defined for some part of an area being convolved, pixels from the current image are filtered with pixels from the background image due to the span of the kernel of the two-input filter. In this exemplary embodiment of the invention, the image is only filtered in an area crossing the boundary between the current image and the background image. .While this may create a visible smeared horizontal and vertical region in the merged image, the boundaries of the merged image would be unfiltered, and thus, in focus.

A possible improvement to the apparatus shown in FIG. 6 is to include a second warp processor 612. Instead of merging a fixed background image at all times, the warp processor 612 allows the background image to be warped to track long-term motion of the current image. The warp processor 612 may be responsive to a signal provided by the image analyzer 414 to cause the background image, which typically is stored in the display reference coordinate system, to follow the long-term motion of the current image. If, for example, the camera 410 pans a scene at a rate of ten pixels per frame, after a few frames, the warp processor 612 may warp the background image by, for example, five pixels per frame so that the background image follows the current image but at a slower, more stable rate. If the camera motion is not smooth but, over time, defines a definite direction, the image analyzer 414 may determine this direction by averaging inter-frame motion vectors for several frames and cause the warp processor 612 to slowly adjust the coordinates of the background image to track the camera motion. Alternatively, if a smooth image adjustment is not necessary, the image analyzer 414 may accumulate a displacement between the coordinate system of the current image and the coordinate system of the background image and, when a predetermined difference has accumulated over several frames, immediately adjust the coordinate system of the background frame to the coordinate system of the current frame. This is best done over an interval of many frames to provide an image which exhibits at least short-term stability. In any event, when the background image is warped, the display reference coordinate system is changed by the same amount. Alternatively, when the display reference coordinate system is changed, the background image is warped to account for the change, Allowing the background image to track the long-term motion of the camera in producing a sequence of current images may also be useful for hiding blank pixel areas in the image. If the display coordinate system varies slowly, the errors in the background construction will be small and less noticeable. The filtering operation to blur the background will prevent these inconsistencies from becoming a serious problem.

While the invention has been described in terms of an exemplary embodiment, it is contemplated that it may be practiced as described above within the scope of the appended claims.

What is claimed:

1. An image stabilizer system comprising:
    a terminal at which a video signal representing a current video frame is received;
    a memory which holds a frame of a background video signal;
    an image analyzer, responsive to the current video frame and the background video frame which determines a transformation to be applied to the current video frame to align the current video frame to the background video frame;
    an image warping processor which applies the transformation determined by the image analyzer to produce a transformed current video frame which is aligned with the background video frame, the transformed current video frame having blank picture elements (pixels) along at least one edge; and
    an image merging processor which substitutes pixels from the background frame for the blank pixels in the transformed current video frame to produce an output video frame.

2. An image stabilizer according to claim 1, wherein the image analyzer controls the image warping processor to insert the pixels from the background frame in place of the blank pixels of the transformed current video frame.

3. An image stabilizer according to claim 1, further including a spatial low-pass filter, coupled between the memory and the image merging processor to apply a spatial low-pass filter frequency response characteristic to the background frame before substituting the pixels from the background frame for the blank pixels in the transformed current video frame.

4. An image stabilizer according to claim 3, further including a further merging processor which substitutes pixels from the background frame for the blank pixels in the transformed current video frame to produce a modified background frame which is applied to the spatial low-pass filter.

5. An image stabilizer according to claim 1, wherein the image analyzer determines a frame-to-frame displacement of the current video frame over several frames to define an average frame-to-frame displacement over the several frames and the image stabilizer further includes a further image warping processor which warps the background frame by the average frame-to-frame displacement to produce a warped background frame which is applied to the image merging processor.

6. An image stabilizer according to claim 5, further including a spatial low-pass filter, coupled between the further image warping processor and the image merging processor to apply a spatial low-pass filter frequency response characteristic to the warped background frame before the warped background frame is applied to the image merging processor.

7. An image stabilizer according to claim 6, further including a further merging processor which substitutes pixels from the warped background frame for the blank pixels in the transformed current video frame to produce a modified warped background frame which is applied to the spatial low-pass filter.

8. An image stabilizer system comprising:
a terminal at which a video signal representing a current video frame is received;
a memory which holds a frame of a background video signal;
an image analyzer, responsive to the current video frame and the background video frame which determines a transformation to be applied to the current video frame to align the current video frame to the background video frame;
an image warping processor which applies the transformation determined by the image analyzer to produce a transformed current video frame which is aligned with the background video frame, the transformed current video frame having blank picture elements (pixels) along at least one edge; and
a two-input image filtering processor which provides pixels of the current video frame when the pixels of the current video frame are not blank pixels and provides filtered pixel values when the pixels of the current video frame are blank pixels to produce an output video frame, wherein the filtered pixel values are formed by processing both non-blank pixels from the current video frame and pixels from the background video frame.

9. A method for stabilizing a current video frame comprising the steps of:
storing a frame of a background video signal;
comparing the background video frame to the current video frame to determine a transformation to be applied to the current video frame which aligns the current video frame to the background video frame;
warping the current video frame according to the determined transformation to produce a transformed current video frame, wherein the transformed current video frame has blank picture elements (pixels) along at least one edge; and
merging the background video frame with the current video frame to replace the blank pixels in the transformed current video frame with corresponding pixels from the background frame.

10. A method according to claim 9, further including the step of applying a spatial low-pass filter frequency response characteristic to the background frame before substituting the pixels from the background frame for the blank pixels in the transformed current video frame.

11. A method according to claim 10, further including the step of merging the background video frame with the current video frame to replace blank pixels in the transformed current video frame with corresponding pixels from the background frame to produce a modified background video frame to which the low-pass filter frequency response characteristic is applied.

12. A method according to claim 9, further including the steps of:
determining a frame-to-frame displacement of the current video frame with respect to the background video frame over several frame intervals to define an average frame-to-frame displacement over the several frame intervals; and
warping the background frame by the average frame-to-frame displacement to produce a warped background frame which is merged with the current video frame.

* * * * *